United States Patent [19]

Laskey

[11] 4,003,476

[45] Jan. 18, 1977

[54] PRESS LOADER

[75] Inventor: Ben G. Laskey, Redwood City, Calif.

[73] Assignee: Benruth Engineering & Manufacturing Company, Inc., Redwood City, Calif.

[22] Filed: Nov. 21, 1975

[21] Appl. No.: 634,026

[52] U.S. Cl. .............................. 214/1 BB; 198/773; 214/1 F

[51] Int. Cl.$^2$ .......................................... B65G 47/74

[58] Field of Search ............... 214/1 R, 1 BB, 1 BT, 214/1 F, 1 S, 16.6; 100/196; 198/218

[56] References Cited

UNITED STATES PATENTS

| | | | |
|---|---|---|---|
| 2,701,065 | 2/1955 | Bertel | 214/6 BA X |
| 3,029,957 | 4/1962 | Freeman et al. | 214/1 BB |
| 3,179,262 | 4/1965 | Carlson, Sr. et al. | 214/1 BT X |
| 3,572,520 | 3/1971 | Evans et al. | 214/1 BB |
| 3,915,312 | 10/1975 | Clark | 214/1 BB |

*Primary Examiner*—Frank E. Werner
*Attorney, Agent, or Firm*—Robert G. Slick

[57] ABSTRACT

A press loader is disclosed having two reciprocating tables. One table is unloaded and loaded while the press is acting upon the other table and the position of the tables is then reversed for a repitition of the operation.

5 Claims, 8 Drawing Figures

PRESS LOADER

SUMMARY OF THE INVENTION

The present invention relates to a loading machine for a flatbed press. Such presses are well known and can be used for a variety of operations such as electronic heat sealing machines, hot stamp presses, silk screen machines, plastic forming machines, and the like. In the past, it has been the practice to employ a rotary table in conjunction with such press operation and it ordinarily requires two people to operate the machine. One person loads the machine as the rotary table moves into an operating position and a second person unloads the machine after the operation is completed. Such machines also occupy a substantial amount of floor space.

In accordance with the present invention, a press feeder is provided which is semi-automatic in operation and which employs two reciprocating, overlapping tables. One of the tables is being unloaded and loaded while the press operation is taking place on the other table, and the tables then change places for a repetition of cycle.

The loader is safe for the operator since the operator stands well away from the actual press operation.

The present invention provides a machine which can be operated by one person and which occupies little floor space. The loader is relatively inexpensive and rugged and is easy to maintain.

Various other features and advantages of the invention will be brought out in the balance of the specification.

BRIEF DESCRIPTION OF THE PREFERRED EMBODIMENTS

Figure 1:
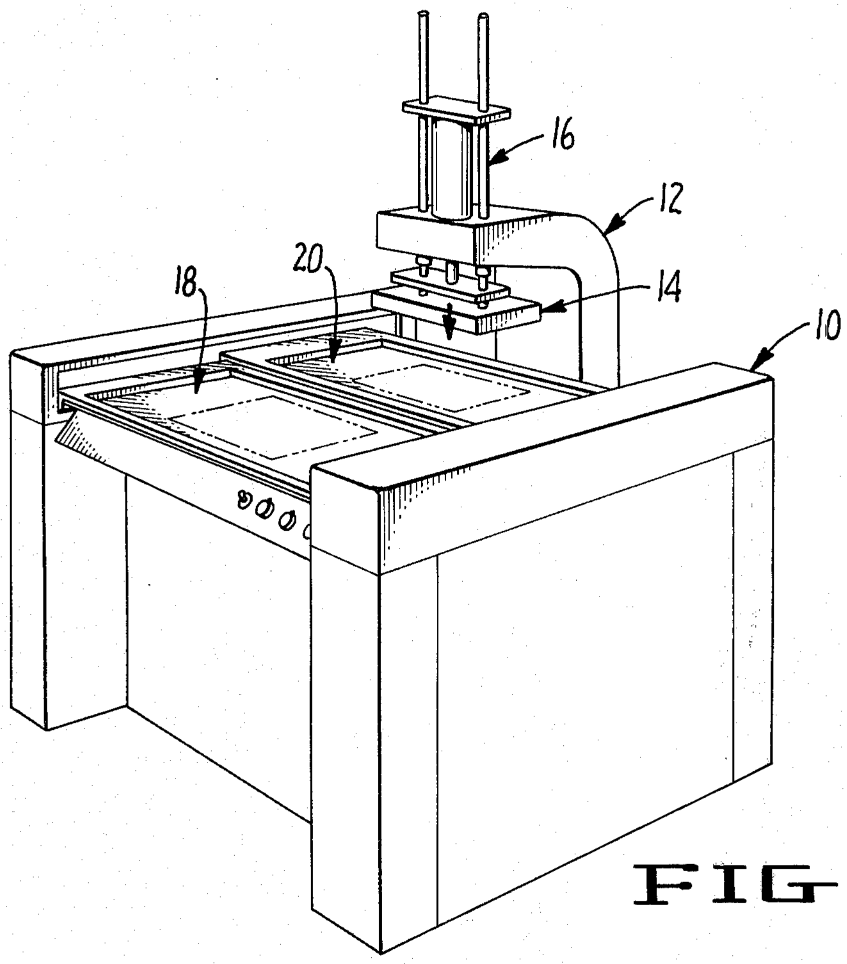
FIG. 1 is a perspective view of a press with a loader embodying the present invention.
Figure 2:
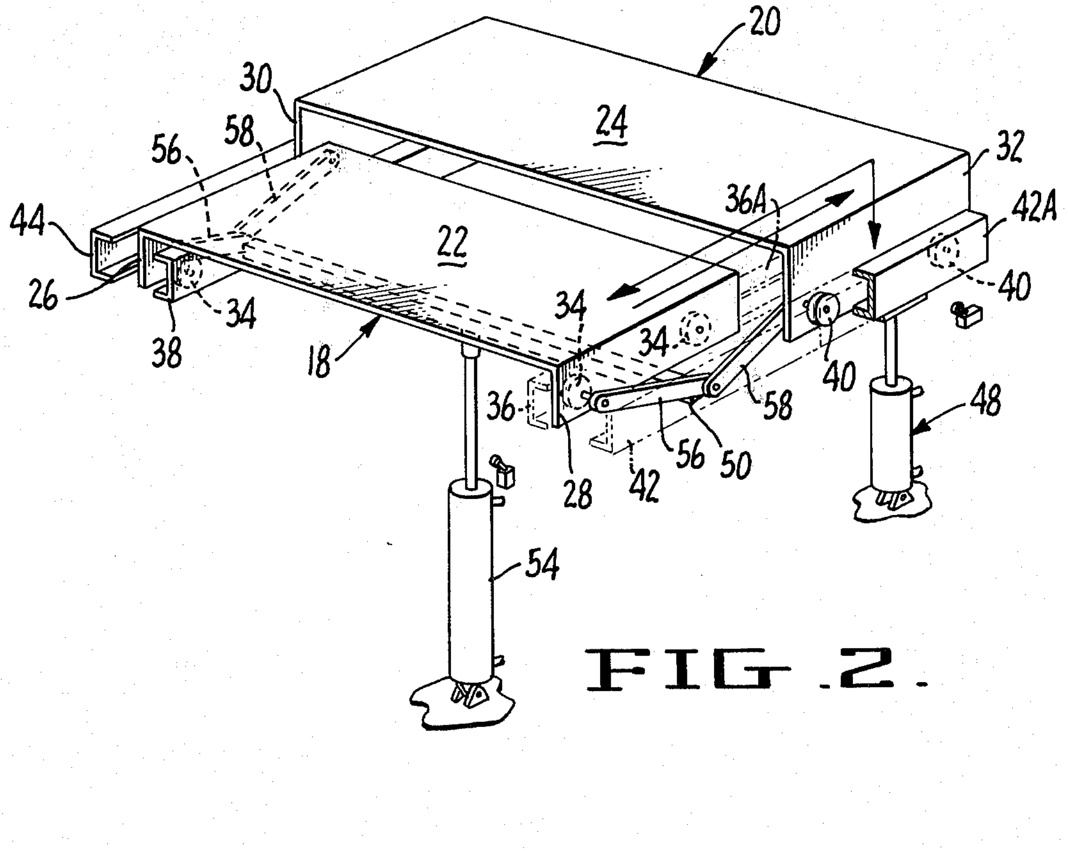
FIG. 2 is a partial perspective view showing the two tables.

Referring now to the drawings by reference characters, the press loader is built into a housing 10 which is designed to fit adjacent a standard pneumatic or mechanical press designated 12. The press itself forms no part of the present invention and is thus not described except to the extent of stating that the press has a plate element 14 with a means 16 to raise and lower the plate against a platen where the actual press operation is conducted.

The loader of the present invention includes two platens generally designated 18 and 20 which hold the work on which a press operation is to be conducted. These platens are carried by tables 22 and 24 respectively. Table 22 has short side flanges 26 and 28 while Table 24 has relatively long side flanges 30 and 32. These tables are provided with rollers to enable the tables to reciprocate on tracks. Thus Table 22 has rollers 34 adapted to roll on inner tracks 36 and 38 while table 24 has similar rollers 40 adapted to roll on outer tracks 42 and 44. The front portions, i.e. the portions adjacent a loading station, of each of these tracks is fixed to the frame of the loader while the rear portions of each of the tracks, designated by the same number followed by the letter A, are supported on a cross member 46 which is attached to a pneumatic cylinder 48 so that the rear portion of each of the tracks can be brought into registration with the front portion of the tracks or lowered from this position as is later described in detail.

Mounted under the tables is a cross bar 50 which is mounted for up and down motion in the guides 52 and with pneumatic cylinder 54 connected thereto to move the bar 50 up and down. Bar 50 carries two toggle links at each end, the two toggle links being pivoted to the tables. Thus links 56 connect the bar to table 22 while links 58 connect the bar to table 24.

Having described the various parts, the overall operation of the device will now be described, particularly with references to FIGS. 3 through 8.

Figure 3:
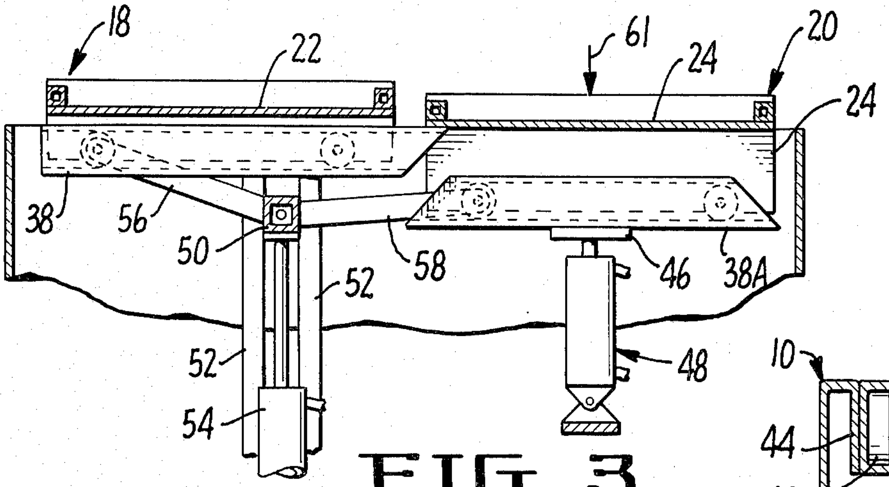
FIG. 3 is a side view of the tables, partly in section.
Figure 7:
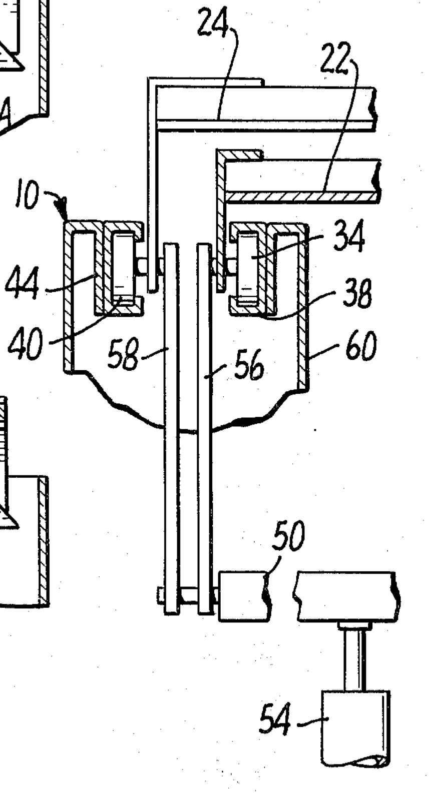
FIG. 7 is a section on the lines 7—7 of FIG. 5.
Figure 4:
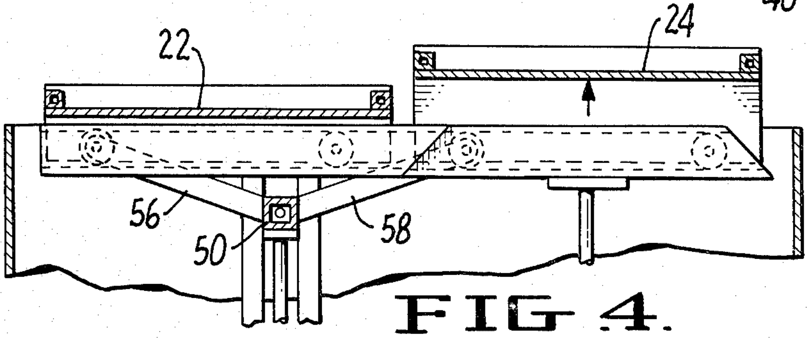
FIG. 4 is a side view, similar to FIG. 3, showing the parts in a different position.
Figure 5:
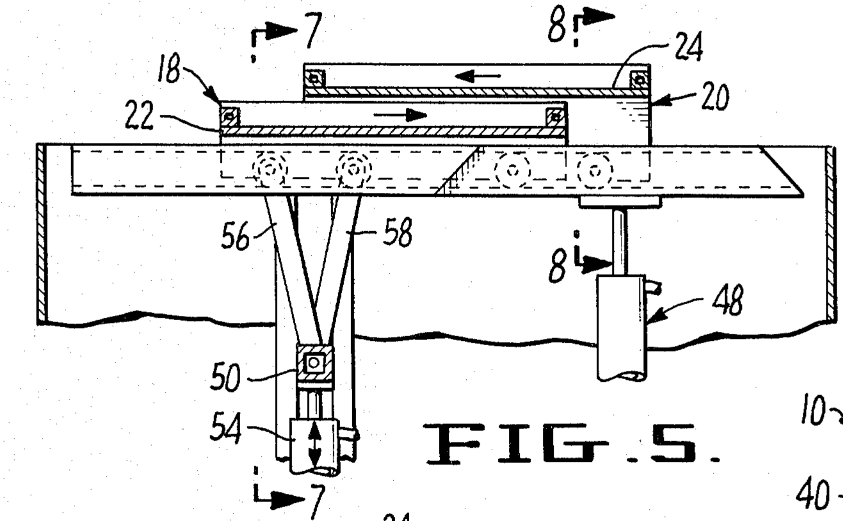
FIG. 5 is a view similar to FIG. 3 showing the action of the tables in crossing over each other.
Figure 8:
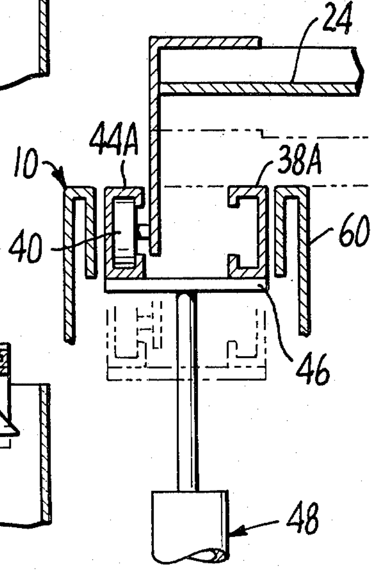
FIG. 8 is a section on the lines 8—8 of FIG. 5.
Figure 6:
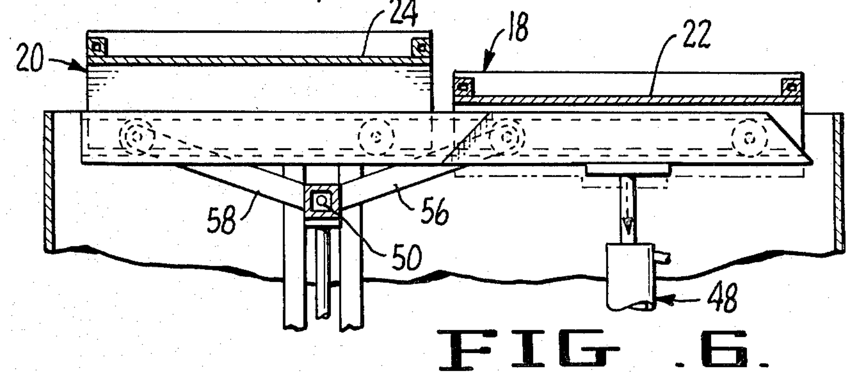
FIG. 6 is a side view, similar to FIG. 3, showing the position of the parts at the completion of a cycle.

In FIG. 3, a press operation is being conducted on platen 20 which is mounted on table 24. As the press comes down, as is indicated by arrow 61, table 24 is brought down by the action of the cylinder 48. The table bottoms out on frame member 60 as is shown in dot-dash lines in FIG. 8. Thus the table is solidly supported during the actual press operation without placing a strain on the rollers or tracks. As the press operation is completed and plate 14 retracts, table 24 is raised by the action of cylinder 48 as is shown in FIG. 4. It will be noted that tracks 36A and 42A now form a continuation of tracks 36 and 42. Bar 50 is now brought down by the action of cylinder 54 and this causes table 24 to move forward and table 22 to move to the rear as is shown in FIG. 5. Inertia causes the tables to pass over the dead center point of the toggle links. As the bar 50 is raised as is shown in FIG. 6, table 24 is brought to its completely forward position while table 22 is brought to the rear position. Table 22 is now under the press and is brought down and bottoms out on the frame member 60 in the same manner as was described in connection with table 24.

It is apparent from the above description that the operation can be conducted very fast. The forward table is loaded by the operator while the rear table is having an actual press operation conducted thereon. The tables then reverse positions whereupon the forward table can be unloaded and a new article placed thereon while the press is conducting an operation on the rear table. Further, it is apparent that the operator is well protected from contact with the press and never needs to put his hands near any dangerous parts.

Although a specific embodiment of the invention has been described, it will be obvious to those skilled in the art that many variations can be made in the exact structure shown without departing from the spirit of this invention.

I claim:

1. A press loader comprising in combination:

a. a first table having long flanges at both ends thereof, b. a second table having short flanges at both ends thereof, c. means associated with said long and short flanges for mounting both tables for simultaneous reciprocating motion on parallel tracks whereby both tables can slide back and forth in overlapping relationship, d. a loading station at one end of said tracks and a press operation station at the opposite end of said tracks, e. means for moving one table to said loading station and the other table to said press operation station and means for reversing the positions of said tables.

2. The press loader of claim 1 wherein the means for moving the tables includes the following:

a. a cross bar under said tables, b. means to move said bar up and down, c. toggle links extending from said cross bar to said tables whereby d. downward movement of said bar causes said tables to move into overlapping relationship and inertia causes said tables to pass over the dead center of said toggle links and reverse positions and upward motion of said bar causes said tables to move to the opposite ends of said tracks.

3. The press loader of claim 2 wherein said tracks are split into two portions, namely a first fixed portion at the loading station and a movable portion adjacent the press operation station and means for moving said movable portion to an upper position in line with the fixed portion and for moving said movable portion to a lower portion.

4. The press loader of claim 3 having a frame member under the movable portion of said track and means for supporting a table on said movable portion of track and said frame member when the frame member is in the lower position.

5. The press loader of claim 3 wherein pneumatic cylinders are employed to reciprocate said tables and to raise and lower said movable portions of said tracks.

* * * * *